No. 782,279. PATENTED FEB. 14, 1905.
F. SAXON.
WHEEL.
APPLICATION FILED AUG. 1, 1904.

WITNESSES

INVENTOR
FRANK SAXON
BY Paul & Paul
HIS ATTORNEYS

No. 782,279. Patented February 14, 1905.

UNITED STATES PATENT OFFICE.

FRANK SAXON, OF WORTHINGTON, MINNESOTA.

WHEEL.

SPECIFICATION forming part of Letters Patent No. 782,279, dated February 14, 1905.

Application filed August 1, 1904. Serial No. 219,058.

*To all whom it may concern:*

Be it known that I, FRANK SAXON, of Worthington, Nobles county, Minnesota, have invented certain new and useful Improvements in Wheels, of which the following is a specification.

My invention relates to wheels adapted for carriages, wagons, automobiles, and other vehicles; and the object of the invention is to provide a wheel of strong and durable construction and one that is equally well adapted for use on either snow, ice, or sandy, muddy, or rocky roads.

The invention consists generally in a wheel-rim having bands secured thereto on each side, the edges of the bands projecting outwardly beyond the wheel-tire.

Further, the invention consists in providing a pad inclosing the wheel-rim and the bands.

Further, the invention consists in various constructions and combinations, all as hereinafter described, and particularly pointed out in the claims.

Figure 1:
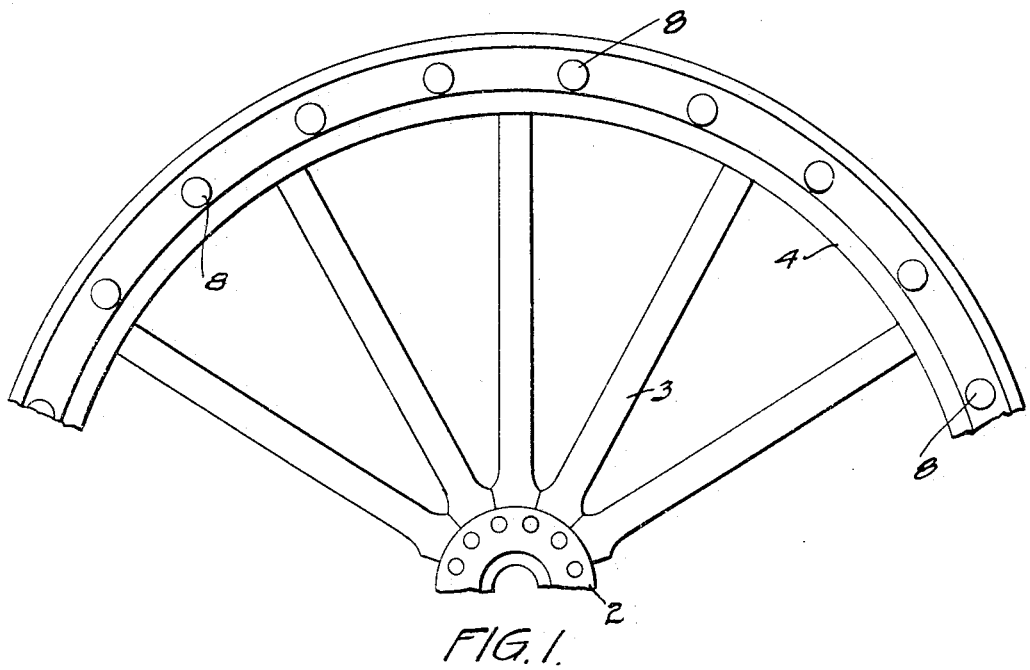
Figure 2:
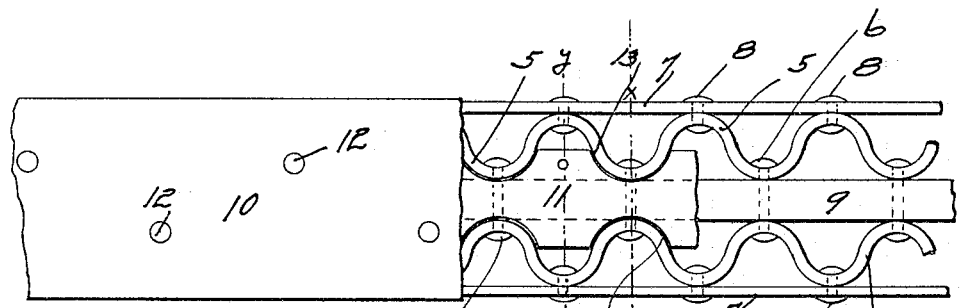
Figure 4:
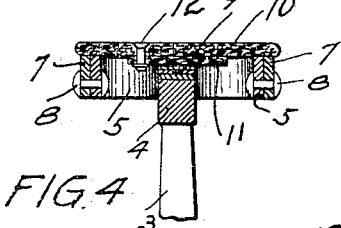
Figure 3:
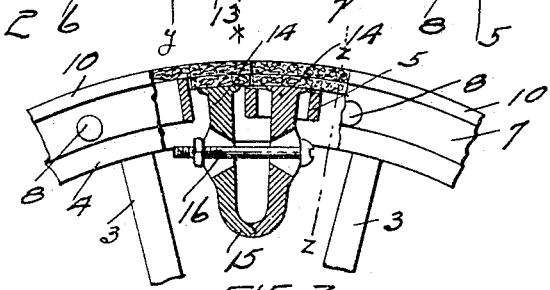
Figure 5:
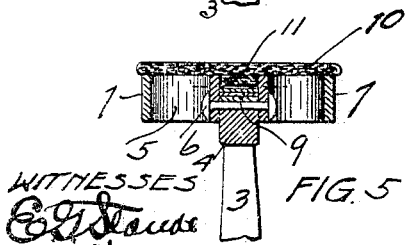
Figure 6:
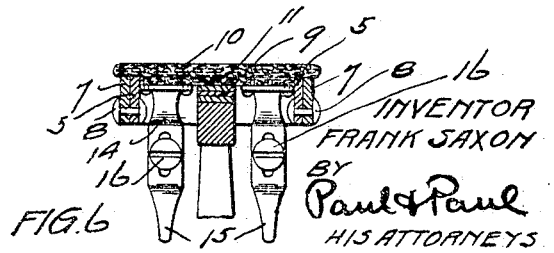

In the accompanying drawings, forming part of this specification, Figure 1 is a side elevation of a portion of a wheel embodying my invention. Fig. 2 is an edge view, a portion of the wheel-tire being broken away to show the construction of the wheel. Fig. 3 is a detail view, partly in section, showing the means for securing the ends of the tire together. Fig. 4 is a sectional view on the line *y y* of Fig. 2, also showing the pad. Fig. 5 is a similar view on the line *x x* of Fig. 2, also showing the pad. Fig. 6 is a detail sectional view on the line *z z* of Fig. 3.

In the drawings, 2 represents a wheel-hub having spokes 3 and an ordinary wooden or other suitable rim 4. Upon each side of this rim I provide bands 5, of serpentine or other suitable form, secured together through the rim by bolts 6 and provided on the outer side with plates 7, secured to the bands by rivets 8. The edges of the bands project beyond the periphery of the wheel-rim and also beyond a series of metal tires 9, secured to the wheel-rim in the usual way. The edges of these bands and the plates 7 form the tread of the wheel and prevent it from slipping sidewise in sandy or muddy roads. The wheel can also be used with equal facility on snow or ice. When the edges of the bands are worn down flush with the surface of the outer metal tire, the latter may be cut through with a hack-saw and removed, leaving the edges of the bands projecting beyond the next tire beneath and making the wheel practically the same as before. This operation may be repeated until the inner metal tire is reached.

If used on paved streets of cities or large towns, a pad 10, of yielding material, is preferably provided, inclosing the wheel-rim and the bands 5, having on its inner surface a similar narrower pad 11, secured by rivets 12 to the outer one and provided with recesses or notches 13 to receive the curved portions of the bands 5 and prevent the outer pad from creeping or slipping sidewise on the wheel. The pads 10 and 11 may be made of canvas, rubber, or any other suitable material and have been found to be a durable and efficient covering for the metal periphery of the wheel where the vehicle is used on paved streets or a very hard road. For country use the pads may be dispensed with.

A wheel of this kind may be used on vehicles of various kinds—such as buggies, wagons, automobiles, &c.—and it is also especially adapted for a traction-engine.

The wheel may be made of any width of tread, according to the character of the road and the type of vehicle upon which it is used.

The ends of the pad 10 are provided with castings 14, that have inner hinged ends 15, connected by a bolt 16, that serves to draw the outer ends of the castings and the abutting ends of the pads together. I prefer to provide two sets of these castings for each tire, one upon each side of the wheel-rim.

The bands 5 are shown of serpentine form; but any other suitable form of bands that can be secured to the rim and to the annular plates 7 may be employed.

I claim as my invention—

1. The combination, with a wheel-rim provided with a series of tires one within the other, of plates secured flatwise to said rim on each side thereof and having an edge that projects beyond the surface of the outer tire, substantially as described.

2. The combination, with a wheel-rim and its tire, of serpentine bands secured to said rim upon each side thereof and having edges that project beyond the rim-tire, and annular plates connecting the curves or bends in said bands on the outer side thereof, substantially as described.

3. The combination, with a wheel-rim, of serpentine bands secured thereto upon each side thereof and having edges that project beyond the periphery of said rim, and a pad of flexible material inclosing said bands and rim.

4. The combination, with a wheel-rim provided on each side with serpentine bands whose edges project outwardly beyond the periphery of said rim, a pad of flexible material having a centrally-arranged band on its inner surface arranged to fit into the space between said serpentine bands, and means for drawing the ends of said flexible pad together.

5. The combination, with a wheel-rim provided with a tire, of metallic bands secured flatwise to said rim upon each side thereof, the outer edges of said bands being smooth and continuous around the wheel and projecting beyond the surface of said tire.

6. The combination, with a wheel-rim provided with a plurality of metal tires, of serpentine bands arranged on each side of said rim and secured thereto and projecting beyond the periphery of the outer metallic tire, annular plates secured to said bands on the outer side thereof, and a flexible pad inclosing said bands and rim and provided with a centrally-arranged strip on its inner surface having notched edges to receive said bands, substantially as described.

7. The combination, with a wheel-rim having a tire, of zigzag metal bands secured flatwise to said rim, the outer edges of said bands being smooth and continuous and projecting beyond the surface of said tire, substantially as described.

8. The combination, with a wheel-rim and its tire, of bands secured to said rim upon each side thereof and having edges that project beyond the rim-tire, and annular plates connected with said bands on the outer side thereof, substantially as described.

9. The combination, with a wheel-rim, of bands secured to said rim upon each side thereof and having edges that project beyond the rim, and annular plates connected with said bands on the outer side thereof, substantially as described.

10. The combination, with a wheel-rim, of bands secured to said rim upon each side thereof and having edges that project beyond said rim, annular plates connected with said bands on the outer side thereof, and a pad of flexible material inclosing said bands and rim, substantially as described.

In witness whereof I have hereunto set my hand this 22d day of July, 1904.

FRANK SAXON.

In presence of—
W. I. CARPENTER,
ADOLPH AMONDSON.